US012208426B2

(12) United States Patent
Shumka et al.

(10) Patent No.: US 12,208,426 B2
(45) Date of Patent: Jan. 28, 2025

(54) RECIPROCATING PRESSURE WASHER SYSTEM FOR CLEANING OPEN GEARS

(71) Applicant: Metso Outotec USA Inc., Brookfield, WI (US)

(72) Inventors: Jason Shumka, Kelowna (CA); Thomas Shumka, Kelowna (CA)

(73) Assignee: Metso Outotec USA Inc., Brookfield, WI (US)

( * ) Notice: Subject to any disclaimer, the term of this patent is extended or adjusted under 35 U.S.C. 154(b) by 144 days.

(21) Appl. No.: 18/025,562

(22) PCT Filed: Sep. 10, 2021

(86) PCT No.: PCT/CA2021/051263

§ 371 (c)(1),
(2) Date: Mar. 9, 2023

(87) PCT Pub. No.: WO2022/051865

PCT Pub. Date: Mar. 17, 2022

(65) Prior Publication Data

US 2023/0330712 A1 Oct. 19, 2023

(30) Foreign Application Priority Data

Sep. 11, 2020 (CA) ................................ CA 3092853

(51) Int. Cl.
*B08B 3/02* (2006.01)

(52) U.S. Cl.
CPC ................ *B08B 3/024* (2013.01); *B08B 3/02* (2013.01); *B08B 2203/0264* (2013.01)

(58) Field of Classification Search
CPC ... B08B 3/00–14; B08B 9/00–46; B05D 1/00; B05D 7/5885; B60S 3/00–066;
(Continued)

(56) References Cited

U.S. PATENT DOCUMENTS 5,031,648 A 7/1991 Lutener et al.
5,146,938 A 9/1992 Lutener et al.
(Continued)

FOREIGN PATENT DOCUMENTS

CN 204035076 U 12/2014
CN 204247588 U 4/2015
(Continued)

OTHER PUBLICATIONS

Search Report and Final Notice for Swedish Patent Application No. 2350285-9, dated Nov. 8, 2023.
(Continued)

*Primary Examiner* — Mikhail Kornakov
*Assistant Examiner* — Richard Z. Zhang
(74) *Attorney, Agent, or Firm* — Andrus Intellectual Property Law, LLP

(57) ABSTRACT

An apparatus for cleaning industrial gear teeth is provided. The apparatus includes a framework; at least one rail mounted on the framework and extending at least a part of a length of the framework; a gantry in slidable engagement with the rail; a stepper motor mounted on the framework and in motive communication with the gantry; a pair of limit switches which are slidably mounted on the rail; a window which is attached to the framework behind the rail, extends along the part of the length of the framework and includes a horizontal slot which extends along the part of the length of the framework; a pipe which is attached to the gantry and extends through the horizontal slot, the pipe for attachment to a source of pressurized cleaning fluid; and a microprocessor which is in electronic communication with die stepper motor and the limit switches.

16 Claims, 6 Drawing Sheets

(58) Field of Classification Search
CPC ......... B60S 1/00–685; F28G 9/00–005; F28G 15/02–06
See application file for complete search history.

(56) References Cited

U.S. PATENT DOCUMENTS

| | | | | |
|---|---|---|---|---|
| 7,571,733 | B1 | 8/2009 | Brozio, Jr. | |
| 2010/0140444 | A1* | 6/2010 | MacNeil | E04G 23/08 248/664 |
| 2010/0294318 | A1* | 11/2010 | Newsom | B08B 9/0826 134/22.18 |
| 2016/0023251 | A1 | 1/2016 | Mitsue et al. | |
| 2021/0276515 | A1* | 9/2021 | Duperon | B60S 3/04 |

FOREIGN PATENT DOCUMENTS

| | | | |
|---|---|---|---|
| CN | 110681629 | A | 1/2020 |
| DE | 29609481 | U1 | 11/1996 |

OTHER PUBLICATIONS

Search Report for Chilean Patent Application No. 202300685, dated May 13, 2024.
Examiner's Report for Chilean Patent Application No. 202300685, dated May 13, 2024.
Search Report for Chilean Patent Application No. 202300685, dated Aug. 19, 2024.
Examiner's Report for Chilean Patent Application No. 202300685, dated Aug. 19, 2024.
International Search Report and Written Opinion for International Application No. PCT/CA2021/051263, mailed Jan. 12, 2022.

* cited by examiner

RECIPROCATING PRESSURE WASHER SYSTEM FOR CLEANING OPEN GEARS

CROSS-REFERENCE TO RELATED APPLICATIONS

This application is the U.S. national stage application of International Application PCT/CA2021/051263, filed Sep. 10, 2021, which international application was published on Mar. 17, 2022, as International Publication WO 2022/051865 A1 in the English language. The International Application claims priority of Canadian Patent Application No. 3092853, filed Sep. 11, 2020.

FIELD

The present technology is directed to an installation for cleaning large open industrial gears. More specifically, it is a pressure washer system for cleaning gears prior to non-destructive testing, maintenance work, visual inspection and preventative maintenance.

BACKGROUND

All gear-driven rotating equipment processing facilities such as the mining, pulp and paper, fertilizer and cement industry, use large gears. For example, the girth gear has straight cut teeth and is about 3 m to about 14 m in diameter. The pinion gear drives the girth gear. It is much smaller, at about 0.5 m to about 2 m diameter. It has helix angles on the gear teeth. These gears cannot be readily removed and transported for testing.

Methods of examining large girth gear teeth to detect surface breaking discontinuities have often been time-consuming and limited in terms of data collected. Methods such as visual and magnetic particle inspection and liquid penetrant testing requires up to 24 hours to clean the gear, resulting in down time of up to 40 hours. These methods can also miss critical discontinuities.

Typically, a gear could be inspected as frequently as every six months or as long as every two years, usually dependent on the insurance company's recommendations, which are based on their risk assessment. Hence, there are no personnel dedicated to conducting the testing. As these gears cost as much as 400,000 to 1.3 million dollars, an incorrect or inaccurate inspection result can cost the asset owner a significant amount of money.

Further, if there is a failure of the gear, this can lead to significant down time. For a copper-molybdenum, gold, iron ore mine this can be in the range of $20,000-$50,000 an hour. It normally takes a minimum of 10 to 12 days to change out a gear set, if there is one on site. If not, it could take up to 50 weeks for a replacement. A catastrophic failure in these gear sets could cost the insurer millions of dollars.

These large gears need to be cleaned prior to inspection, maintenance or if slurry ingress occurs. During part of the cleaning process, the mill cannot be used, and therefore the longer the process takes, the more down time there is. Most cleaning methods and inspection methods take between 10 and 12 hours and can take as much as two days. Currently, most cleaning is done manually with a person operating a pressure washer. This presents a safety risk by placing them near heavy rotating equipment and cleaning chemicals. Spray bars with multiple pressure washer nozzles are often used for automatic cleaning, however they often use larger amounts of cleaner which can be more expensive and worse for the environment.

Chinese Utility Model No. 204035076U discloses gear cleaning equipment, especially a kind of gear cleaning machine. This gear cleaning machine comprises fuselage, column, head and stepper motor, described head is fixed on fuselage by column, stepper motor is provided with in fuselage, telescopic shaft is provided with bottom described head, positioning disc is provided with bottom telescopic shaft, slide rail circle is provided with bottom positioning disc, vertical several rotating shafts of embedding in slide rail circle, copper cash brush is provided with bottom rotating shaft, the copper cash side of brushing is provided with spray head, the copper cash side of brushing is provided with spray head, head is provided with aqueous cleaning agent storage bin, aqueous cleaning agent storage bin is connected with spray head by delivery hose, fuselage is provided with conveyer belt, the conveyer belt left and right sides is provided with arc clamp. Gear cleaning machine after improvement achieves the automation of cleaning process, saves labour, effectively improves cleaning efficiency and quality. This would not be suitable for cleaning large, open industrial gears.

U.S. Pat. Nos. 5,031,648 and 5,146,938 disclose a composition and a method of cleaning lubricated surfaces subject to residual buildup such as large mill gears, shovels and draglines. The composition comprises at least one terpene being capable of dissolving or softening hardened lubricants and residuals, hydrocarbon solvent, an extreme pressure lubricant and surfactants. The method for cleaning mill gears comprises applying a solution comprising at least one terpene being capable of dissolving or softening soils containing grease or oil, aliphatic hydrocarbon solvent, biodegradable surfactants, an extreme pressure lubricant and thickeners to the area to be cleaned, continuously applying the solution to contact the surface and penetrate and dissolve the surface grease, and thereafter rinsing the surface to remove the dissolved surface greases and the cleaning composition. The initial spraying is carried out during use of the mill gear whereas the rinsing is carried out as the mill gear is inched. The present invention provides a composition which dissolves gear lube accumulations effectively and in an environmentally acceptable manner as well as a method of cleaning mill gears resulting in significant savings in terms of labor and downtime of the equipment. The solution is safe to use on painted surfaces and emulsifies quickly when sprayed with water-soap solutions. The method is not automated and requires an operator to manually spray the gear. This poses a safety hazard both because the operator is exposed to the chemicals in the lubricant and in the cleaner, and because they are working around an operating gear.

What is needed is an apparatus that can be used to clean gears without the operator having to perform the spraying. It would be preferable if the spray nozzle was reciprocated back and forth substantially along the length of a gear tooth. It would be further preferable if the spray nozzle could be swiveled in order to clean along the entire length of the gear tooth as the ends of the gear are often behind the gear guard. It would be preferable if the installation included a frame with a window to allow an operator to view the cleaning process. It would be further preferable if the installation was a simple design that was robust enough to withstand operating in a harsh and dirty environment.

SUMMARY

The present technology is an apparatus for autonomously cleaning large industrial gears and other rotating equipment. The spray nozzle is reciprocated back and forth substantially along the length of a gear tooth. The spray nozzle can be swiveled in order to clean along the entire length of the gear tooth including the sections that are hidden by the gear guard. The apparatus includes a frame with an inspection window to allow an operator to view the cleaning process. The frame is magnetically retained on the gear guard. The apparatus is a simple design that is robust enough to withstand operating in a harsh and dirty environment.

In one embodiment an apparatus for cleaning industrial gear teeth is provided, the apparatus comprising: a framework; at least one rail mounted on the framework and extending at least a part of a length of the framework; a gantry in slidable engagement with the rail; a stepper motor mounted on the framework and in motive communication with the gantry; a pair of limit switches which are slidably mounted on the rail; a window which is attached to the framework behind the rail, extends along the part of the length of the framework and includes a horizontal slot which extends along the part of the length of the framework; a pipe which is attached to the gantry and extends through the horizontal slot, the pipe for attachment to a source of pressurized cleaning fluid; and a microprocessor which is in electronic communication with the stepper motor and the limit switches.

In the apparatus, the motive communication may be a drive mechanism attached to the gantry, attached to the framework and in motive communication with the stepper motor.

In the apparatus, the drive mechanism may be a chain drive.

The apparatus may further comprise a swivel between the gantry and the pipe.

The apparatus may further comprise a pressure washer flow toggle on the pipe.

In the apparatus, the pressure washer flow toggle may be under control of the microprocessor.

In another embodiment, an installation comprising an industrial gear set and an apparatus for cleaning industrial gear teeth is provided, the apparatus comprising: a framework which is located in front of the industrial gear set; at least one rail mounted on the framework and extending at least a part of a length of the framework; a gantry in slidable engagement with the rail; a stepper motor mounted on the framework and in motive communication with the gantry; a pair of limit switches which are slidably mounted on the rail; a window which is attached to the framework behind the rail, extends along the part of the length of the framework and includes a horizontal slot which extends along the part of the length of the framework; a pipe which is attached to the gantry, extends through the horizontal slot towards the industrial gear set, the pipe for attachment to a source of pressurized cleaning fluid; and a microprocessor which is in electronic communication with the stepper motor and the limit switches.

In the installation, the motive communication may be a drive mechanism attached to the gantry, attached to the framework and in motive communication with the stepper motor In the installation, the drive may be a chain drive.

The installation may further comprise a swivel between the gantry and the pipe.

The installation may further comprise a pressure washer flow toggle on the pipe.

In the installation, the pressure washer flow toggle may be under control of the microprocessor.

In the installation, the industrial gear set may be a girth gear set.

In another embodiment, a method of cleaning at least one tooth of an industrial gear is provided, the method comprising:

- providing an apparatus that includes: a framework; at least one rail mounted on the framework and extending at least a part of a length of the framework; a gantry in slidable engagement with the rail; a stepper motor mounted on the framework and in motive communication with the gantry; a pair of limit switches which are slidably mounted on the rail; a window which is attached to the framework behind the rail, extends along the part of the length of the framework and includes a horizontal slot which extends along the part of the length of the framework; pipe which is attached to the gantry and extends through the horizontal slot; and a microprocessor which is in electronic communication with the stepper motor and the limit switches;
- attaching the pipe to a source of pressurized cleaning fluid;
- turning the apparatus on; and
- spraying the tooth of the industrial gear with the cleaning fluid, thereby cleaning at least one tooth.

The method may further comprise advancing the gear to clean a subsequent tooth.

The method may further comprise recurrently cleaning a tooth and advancing the gear to clean teeth.

FIGURES

DESCRIPTION

Except as otherwise expressly provided, the following rules of interpretation apply to this specification (written description and claims): (a) all words used herein shall be construed to be of such gender or number (singular or plural) as the circumstances require; (b) the singular terms “a”, “an”, and “the”, as used in the specification and the appended claims include plural references unless the context clearly dictates otherwise; (c) the antecedent term “about” applied to a recited range or value denotes an approximation within the deviation in the range or value known or expected in the art from the measurements method; (d) the words “herein”, “hereby”, “hereof”, “hereto”, “hereinbefore”, and “hereinafter”, and words of similar import, refer to this specification in its entirety and not to any particular paragraph, claim or other subdivision, unless otherwise specified; (e) descriptive headings are for convenience only and shall not control or affect the meaning or construction of any part of the specification; and (f) “or” and “any” are not exclusive and “include” and “including” are not limiting. Further, the terms “comprising,” “having,” “including,” and “containing” are to be construed as open-ended terms (i.e., meaning “including, but not limited to,”) unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
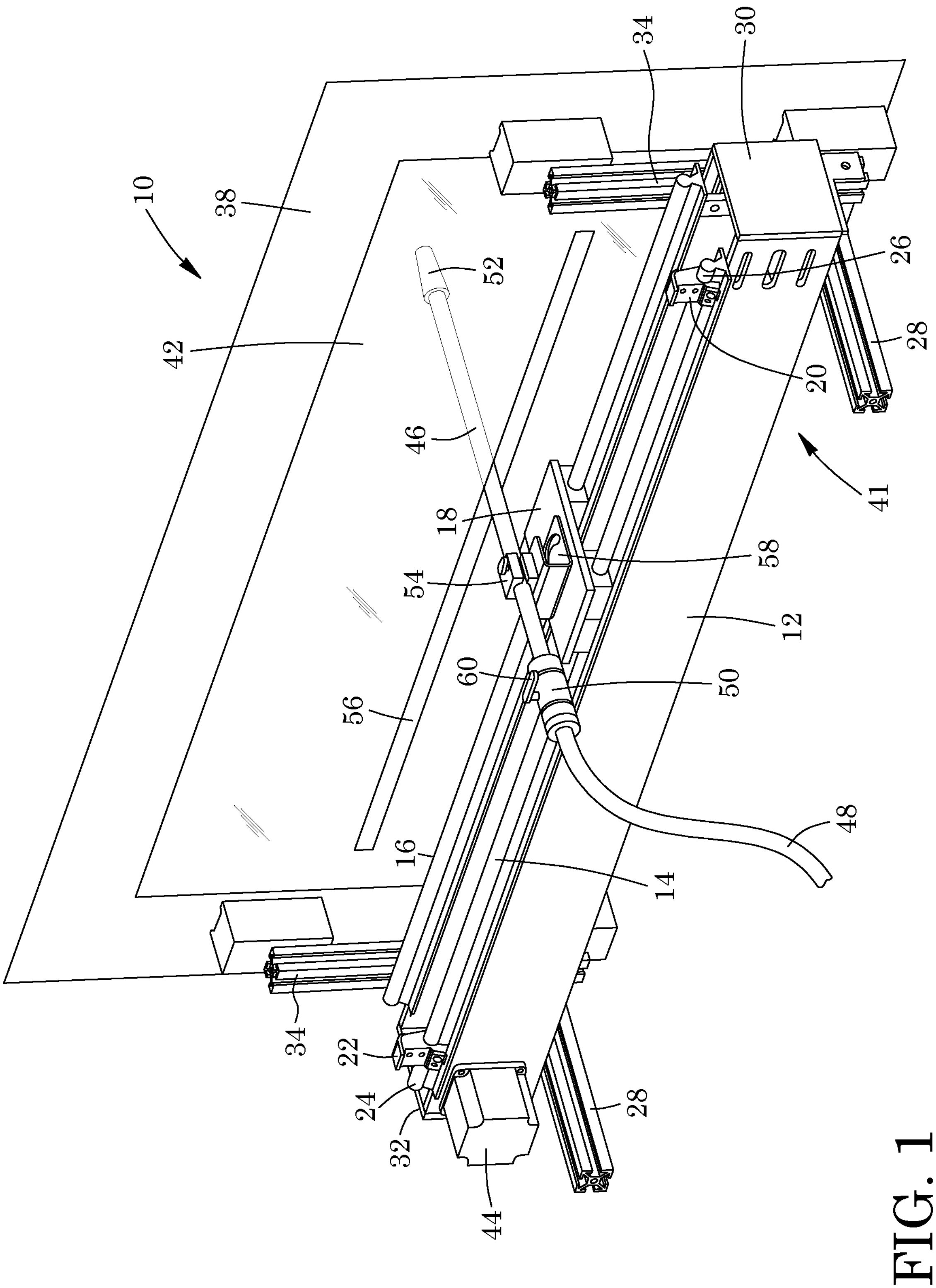
FIG. 1 is a perspective view of the apparatus of the present technology.

An apparatus, generally referred to as 10 is shown in FIG. 1. A body 12 retains two rails 14, 16 upon which a gantry 18 is slidably mounted. One of the rails 14 has limit switches 20, 22 proximate each end 24, 26. The limit switches 20, 22 are releasably retained on the rail 14 can be moved to accommodate different lengths of travel. The body 12 is mounted on arms 28 proximate each end 30, 32 of the body 12.

Figure 2:
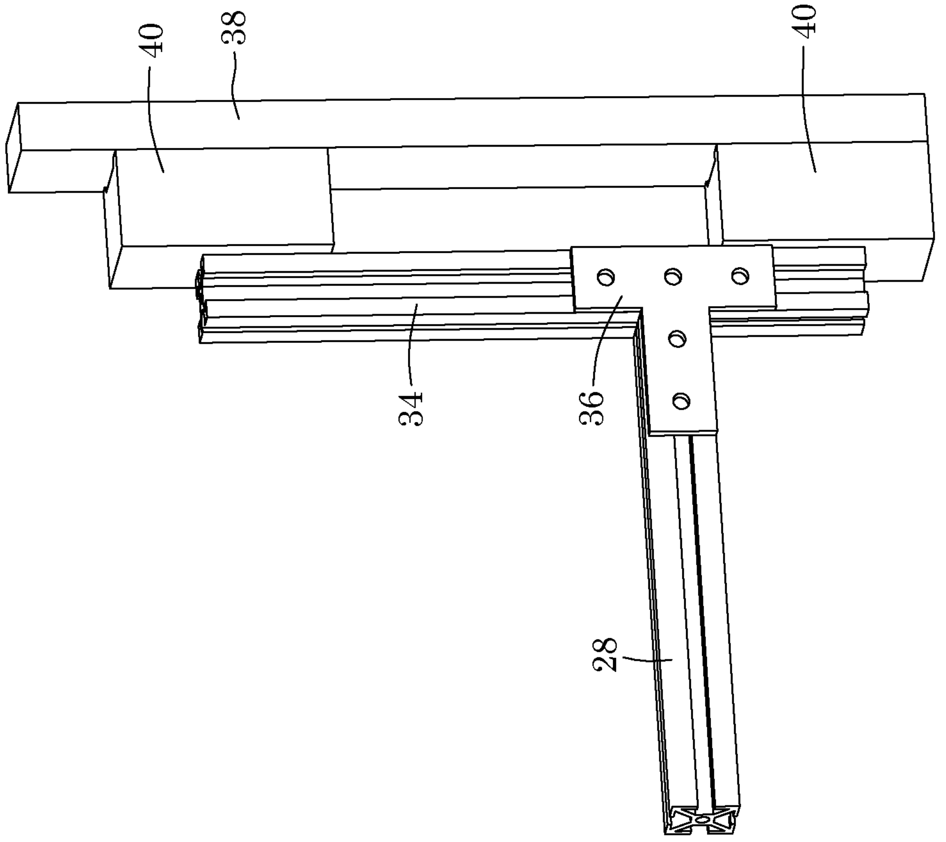
FIG. 2 is a side view of the arms of the apparatus of FIG. 1.

As shown in FIG. 2, the arms 28 are attached to vertical members 34 with brackets 36. The backets 36 allow for horizontal and vertical adjustment of the arms 28. The vertical members 34 are attached to a frame 38 with magnets 40. In an alternative embodiment, the vertical members 34 are attached to the frame 38 with bolts, screws, rivets or the like.

Returning to FIG. 1, the body 12, arms 28 and vertical members 34 are collectively referred to as the framework, generally referred to as 41. The frame 38 houses a window 42. A stepper motor 44 is in motive relation with the gantry 18. A pipe 46 is attached to a cleaning solution line 48 by a connector 50 and terminates in a spray nozzle 52. The pipe 46 is retained on the gantry 18 with a clamp 54. A horizontal slot 56 in the window 42 allows for horizontal movement of the pipe 46. A pressure nozzle flow toggle 60 controls the flow of the cleaning fluid and is on the pipe 46.

Figure 3:
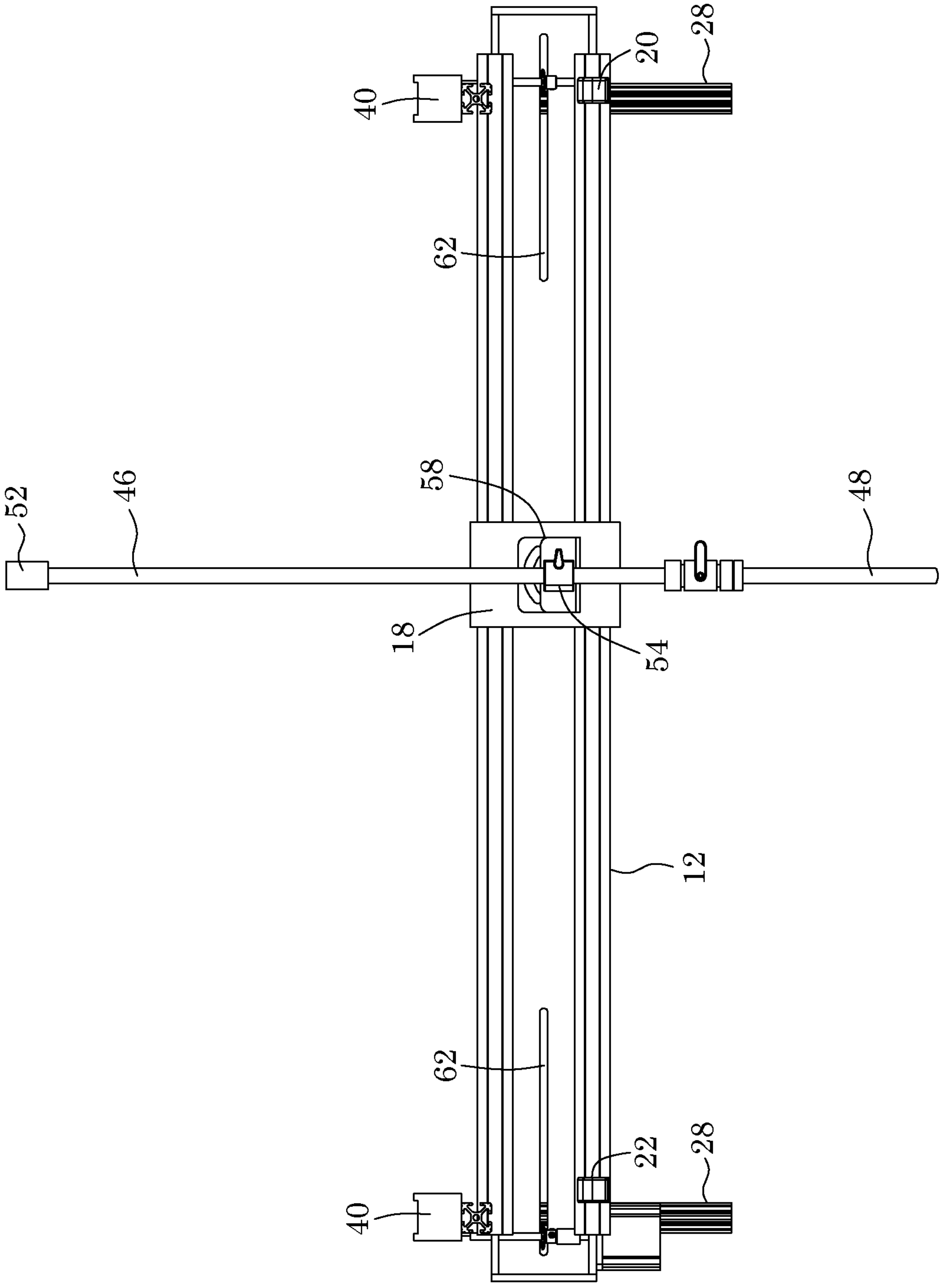
FIG. 3 is a top view of the apparatus of FIG. 1.

FIG. 3 shows a top view of the apparatus 10. The swivel 58 mounted between the gantry 18 and the clamp 54 allows for the pipe 46 and the spray nozzle 52 to be angled relative to the body 12, between about 90 degrees to about 25 degrees and 155 degrees. Slots 62 allow for horizontal adjustment of the arms 28.

Figure 4:
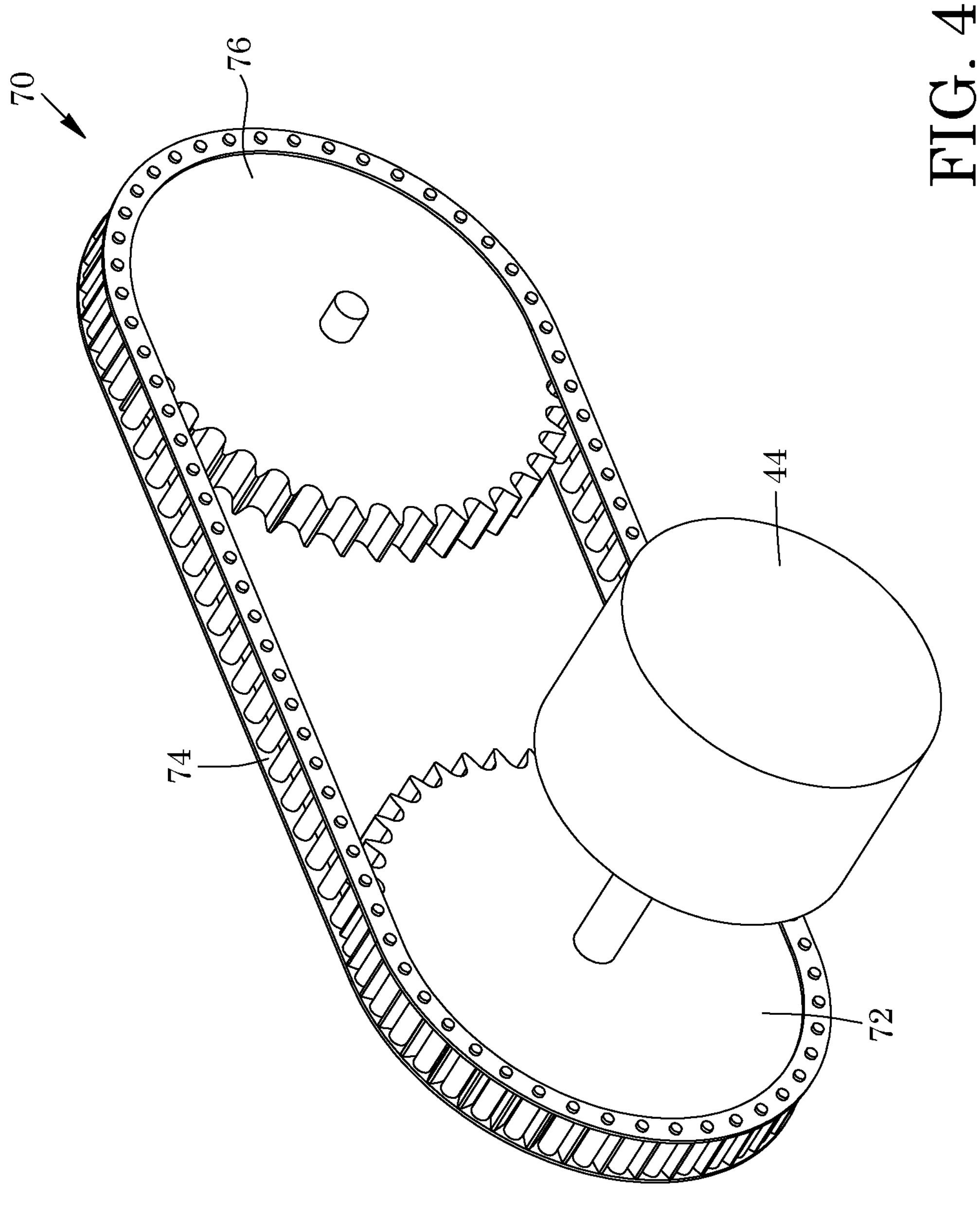
FIG. 4 is a perspective view of the chain drive of the apparatus of FIG. 1.

FIG. 4 shows a chain drive, generally referred to as 70, that is used to move the gantry 18 back and forth along the rails 14, 16. The stepper motor 44 drives a first sprocket 72. A chain 74 is attached to the gantry 18. A second sprocket 76 is rotatably attached to the body 12. The chain 74 is rotatably mounted on the sprockets 72, 76.

Figure 5:
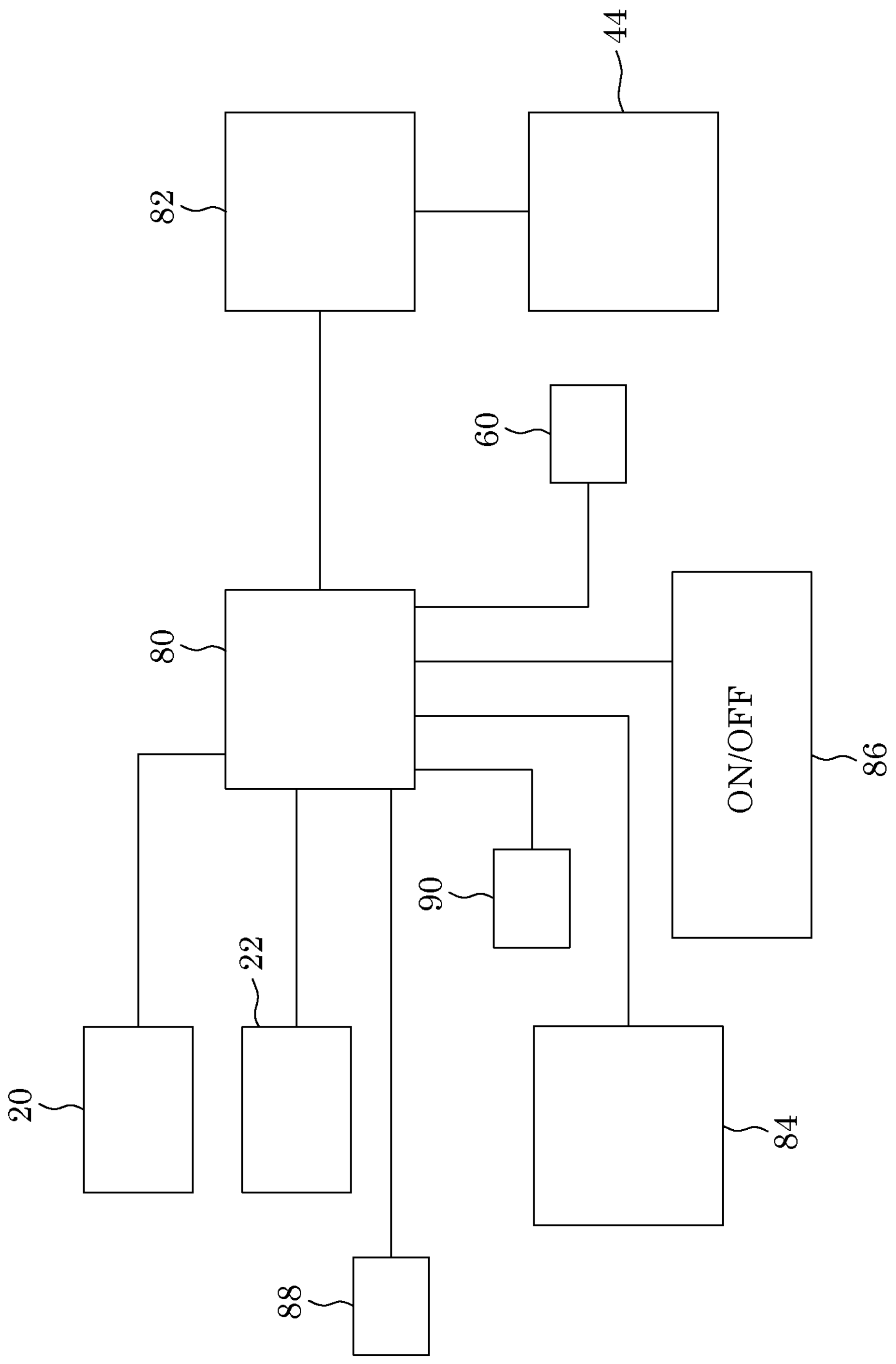
FIG. 5 is a schematic of the microprocessor and the components it controls.

The apparatus 10 is under control of a microprocessor 80. As shown in FIG. 5, the microprocessor 80 communicates with a stepper driver circuit 82 which steps the stepper motor 44. The stepper drive circuit 82 includes speed control, including variable speed control. Variable speed control can be used to reduce the speed of travel as the gantry nears the end or travel. This feature can be used when the nozzle needs to be angled in order for the cleaning solution to reach gear teeth that are located behind the gear guard. The limit switches 20, 22 communicate with the microprocessor 80 which in turn controls the direction of movement of the gantry 18. A user interface 84, an ON/OFF switch 86, a status light emitting diode 88, an automatic shutoff 90 and the pressure washer flow toggle 60 are all under control of the microprocessor 80. Additionally, the user may manually control the speed.

In other embodiments, the chain drive may be replaced with a lead screw, a timing belt, or a rotating arm to provide the reciprocating action.

In another embodiment, the pair of rails may be replaced with a single rail or more than two rails.

The apparatus 10 can be permanently installed and used as an installation or it can be moved from site to site. As an installation, it can be combined with the technology disclosed in Canadian Patent Application Serial Number 3034204 and entitled, "Imaging system for assessing integrity of metal motive parts in industrial plants", the contents of which are incorporated by reference in their entirety. The apparatus is especially useful for cleaning teeth of girth gear sets, which include a girth gear and a pinion gear. Cleaning is followed with non-destructive testing of the gears. The preferred testing method is inspecting using eddy current array probes.

Figure 6:
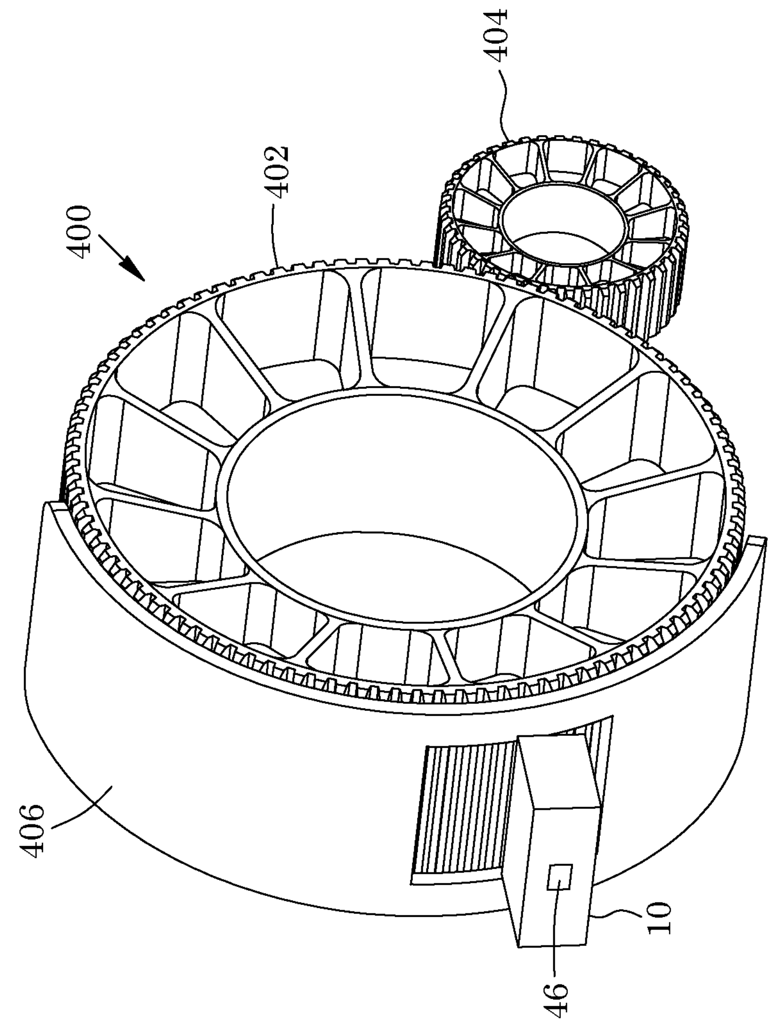
FIG. 6 is a perspective view of an installation.

An installation, generally referred to as 400 is shown in FIG. 6. A girth gear 402 is driven by a pinion gear 404. The apparatus 10 located in front of the girth gear 402 with the pipe 46 pointing towards the gear. The gear guard 406 may or may not cover part of the girth gear 402.

In use, the gantry 18 moves back and forth, hitting the limit switches 20, 22, which have been adjusted to be aligned with the guard of the gear. The limit switches 20, 22 send a signal to reverse the direction of the stepper motor 44 and hence the direction of the gantry 18. The speed is controlled and may be variable. If there is an increase in resistance detected by the microprocessor 80, it will communicate with the automatic shut off 90 to shut the stepper motor 44 off.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. For example, other imaging techniques may be used, resulting in other images being analyzed. Such equivalents are intended to be encompassed in the scope of the claims, if appended hereto or subsequently filed.

The invention claimed is:

1. An apparatus for cleaning industrial gear teeth, the apparatus comprising: a framework; at least one rail mounted on the framework and extending at least a part of a length of the framework; a gantry in slidable engagement with the at least one rail; a stepper motor mounted on the framework and in motive communication with the gantry; a pair of limit switches which are slidably mounted on the at least one rail; a window which is attached to the framework behind the at least one rail, the window extends along the part of the length of the framework and includes a horizontal slot which extends along the part of the length of the framework; a pipe which is attached to the gantry and extends through the horizontal slot, the pipe for attachment to a source of pressurized cleaning fluid; and a microprocessor which is in electronic communication with the stepper motor and the limit switches.

2. The apparatus of claim 1, further comprising a drive mechanism attached to the gantry, attached to the framework and in motive communication with the stepper motor.

3. The apparatus of claim 2, wherein the drive mechanism is a chain drive.

4. The apparatus of claim 1, further comprising a swivel between the gantry and the pipe.

5. The apparatus of claim 1, further comprising a pressure washer flow toggle on the pipe.

6. The apparatus of claim 5, wherein the pressure washer flow toggle is under control of the microprocessor.

7. An installation comprising an industrial gear set and an apparatus for cleaning industrial gear teeth, the apparatus comprising: a framework which is located in front of the industrial gear set; at least one rail mounted on the framework and extending at least a part of a length of the framework; a gantry in slidable engagement with the at least one rail; a stepper motor mounted on the framework and in motive communication with the gantry; a pair of limit switches which are slidably mounted on the at least one rail; a window which is attached to the framework behind the at least one rail, the window extends along the part of the length of the framework and includes a horizontal slot which extends along the part of the length of the framework; a pipe which is attached to the gantry, extends through the horizontal slot towards the industrial gear set, the pipe for attachment to a source of pressurized cleaning fluid; and a microprocessor which is in electronic communication with the stepper motor and the limit switches.

8. The installation of claim 7, further comprising a drive mechanism attached to the gantry, attached to the framework and in motive communication with the stepper motor.

9. The installation of claim 8, wherein the drive mechanism is a chain drive.

10. The installation of claim 7, further comprising a swivel between the gantry and the pipe.

11. The installation of claim 7, further comprising a pressure washer flow toggle on the pipe.

12. The installation of claim 11, wherein the pressure washer flow toggle is under control of the microprocessor.

13. The installation of claim 7, wherein the industrial gear set is a girth gear set.

14. A method of cleaning tooth of an industrial gear, the method comprising:

providing an apparatus that includes: a framework; at least one rail mounted on the framework and extending at least a part of a length of the framework; a gantry in slidable engagement with the at least one rail; a stepper motor mounted on the framework and in motive communication with the gantry; a pair of limit switches which are slidably mounted on the at least one rail; a window which is attached to the framework behind the at least one rail, the window extends along the part of the length of the framework and includes a horizontal slot which extends along the part of the length of the framework; a pipe which is attached to the gantry and extends through the horizontal slot; and a microprocessor which is in electronic communication with the stepper motor and the limit switches;

attaching the pipe to a source of pressurized cleaning fluid;

turning the apparatus on; and spraying the tooth of the industrial gear with the cleaning fluid, thereby cleaning the tooth.

15. The method of claim 14, further comprising advancing the gear to clean a subsequent tooth.

16. The method of claim 15, wherein the spraying and the advancing are performed recurrently.

* * * * *